Figures 3, 4:
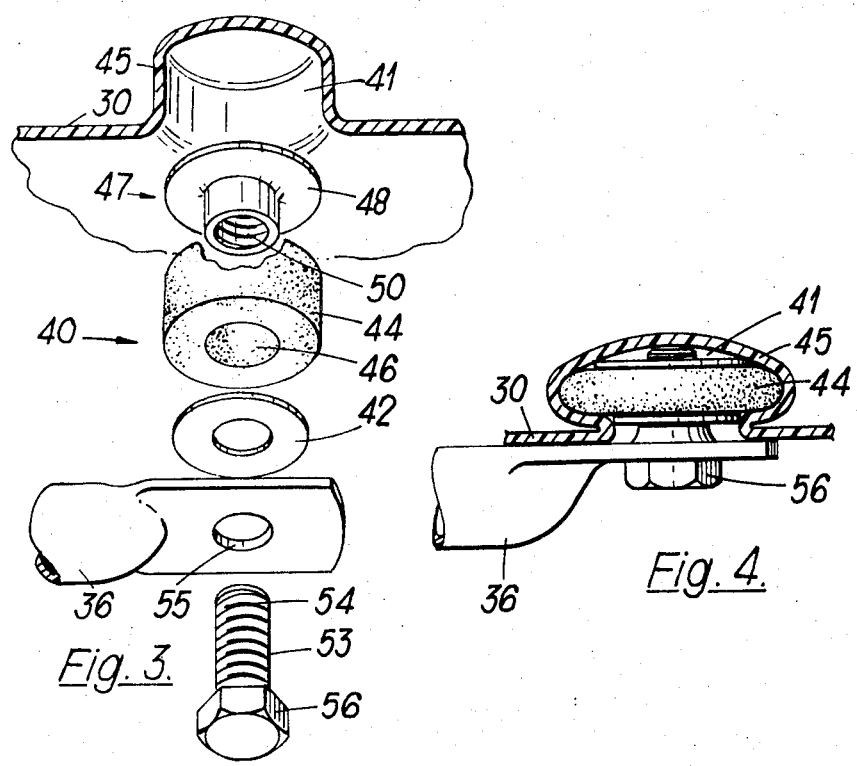

United States Patent [19]
Dufton

[11] 3,751,109

[45] Aug. 7, 1973

[54] METHOD OF MAKING A SEAT SHELL

[75] Inventor: Ronald Dufton, Bushey Heath, England

[73] Assignee: Du-Al Furniture Limited, Middlesex, England

[22] Filed: Sept. 20, 1971

[21] Appl. No.: 181,751

[30] Foreign Application Priority Data
Oct. 2, 1970  Great Britain .................. 47,086/70

[52] U.S. Cl. ................................. 297/445, 297/456
[51] Int. Cl. ........................... A47c 3/00, A47c 7/14
[58] Field of Search ............ 297/445, 452, 454–459

[56] References Cited
UNITED STATES PATENTS

| | | |
|---|---|---|
| 3,259,431 | 7/1966 | Gale ................................. 297/445 |
| 3,159,428 | 12/1964 | Schier ............................... 297/445 |
| 3,669,496 | 6/1972 | Chisholm ........................... 297/445 |

Primary Examiner—Casmir A. Nunberg
Attorney—Cushman, Darby & Cushman

[57] ABSTRACT

A method of making a seat shell having an inner and an outer wall with a cavity therebetween, said method including expanding a hollow softened element of thermoplastic synthetic resin material against the internal surfaces of a mould by injecting a gaseous fluid into said hollow softened element, the mould being so shaped that the seat shell produced therefrom has a seat portion and a back rest portion which are integral with each other.

6 Claims, 5 Drawing Figures

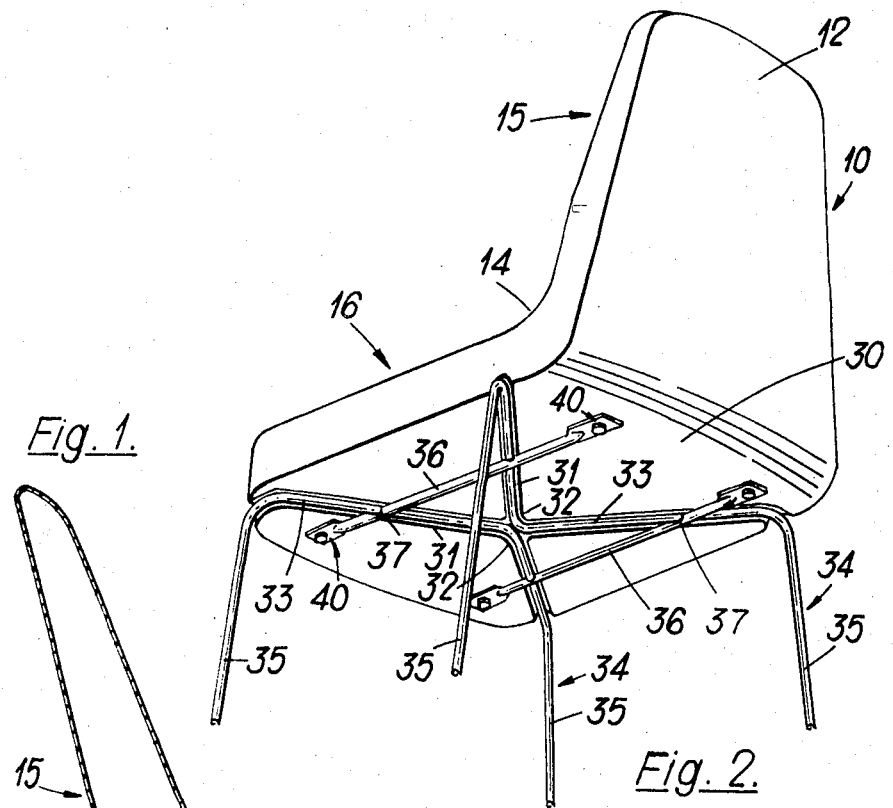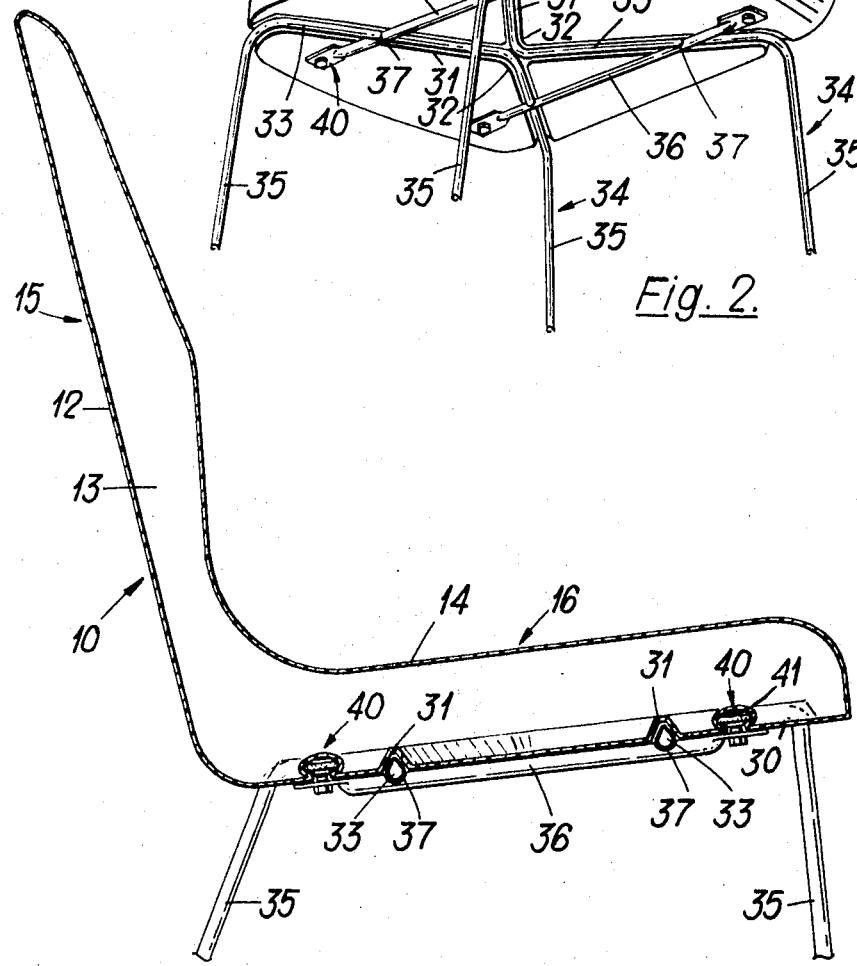

PATENTED AUG 7 1973 3,751,109

Inventor
RONALD DIFTON
By
Cushman Darby Cushman
Attorneys

METHOD OF MAKING A SEAT SHELL

This invention concerns a seal comprising a seat shell having an inner and an outer wall with a cavity therebetween.

According to one aspect of the present invention, there is provided a seat comprising a seat shell and support structure therefor, said seat shell having inner and outer walls of blow moulded thermoplastic synthetic resin material which are integral with each other but which have a space therebetween, the seat shell having integral seat and backrest portions, the outer wall of the seat portion being resilient and having means defining a cavity therein, and a fastening device, secured to the support structure, for fastening the seat shell thereto, said fastening device being located in said cavity and deforming the resilient wall of the latter into a re-entrant shape which prevents withdrawal of the fastening device from the cavity.

The said synthetic resin material may be, for example, a polypropylene or a high density polyethylene.

The said cavity within the said shell may be filled with a foamed plastics material. For example, a foamable plastics material may be injected into the said cavity, the said material being foamed in situ therein.

Preferably the shell is pierced to provide an injection hole and a vent hole, and the said foamable plastics material is injected into the cavity through the said injection hole.

The fastening device may comprise elastomeric means which are disposed between two members, and clamping means which force the two members towards each other so as to compress the elastomeric means and thus force the latter to cause deformation of the resilient wall.

Figure 5:
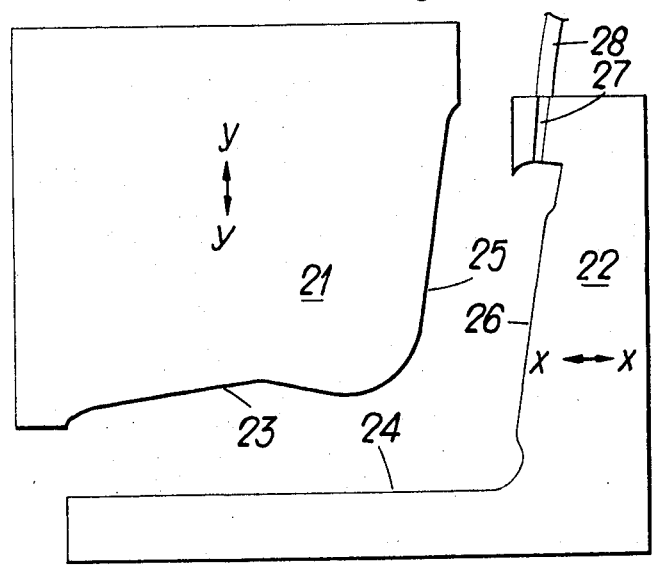

The invention is illustrated merely by way of example in the accompanying drawings, in which:

FIG. 1 shows a cross-sectional view of a chair made in accordance with the present invention, FIG. 2 is a rear perspective view of the chair of FIG. 1, FIG. 3 is an exploded view of parts of a fastening device, FIG. 4 shows the said fastening device when fully tightened, and FIG. 5 shows diagrammatically a cross-section of a mould suitable for use in connection with the present invention.

Referring now to FIGS. 1 and 2, an L-shaped chair seat shell shown generally at 10 has an inner wall 14 and an outer wall 12 with a cavity 13 therebetween. The shell 10 is formed to provide a back rest portion 15 and a seat portion 16 which are integral with each other.

The shell 10 is made by a blow moulding operation which will be described with reference to FIG. 5. A tubular parison (not shown) of a high melt strength thermoplastics synthetic resin material, for example, a polypropylene (e.g., of antistatic grade granules marketed by Imperial Chemical Industries under the trade name Propathene GPE 102/52) or a high density polyethylene from which the shell is to be made, is preheated to its softening temperature (e.g., 199° to 205°C) and fed between mould halves 21, 22 of a composite steel mould. The mould half 21 is movable vertically (as viewed in FIG. 5) as indicated by a double headed arrow y. The mould half 22 is movable horizontally (as viewed in FIG. 5) as indicated by a double headed arrow x. When the parison is in position between the mould halves 21, 22, the latter are moved together (e.g., with an applied force of 60 tons) to form the composite mould which has internal surfaces 23, 24, 25 and 26. The moving together of the mould halves 21, 22 causes the hollow interior of the parison to be sealed. Air is then injected, e.g., at 40 pounds per square inch, into the sealed hollow interior of the parison via, for example, a nozzle 27 which is formed in the mould half 22 and which is supplied with the air from a source not shown via a pipe 28.

When the air is injected into the sealed hollow interior of the parison, the parison is inflated against the interior of the parison, the parison is inflated against the internal surfaces 23, 24, 25 and 26 of the mould halves to form the shell 10 shown in FIG. 1. The surfaces 23 and 24 form the shape of the back rest portion 15, and the surfaces 25 and 26 form the shape of the seat portion 16.

It will be appreciated that any suitable gaseous fluid may be used instead of air.

The blow moulded shell 10 is then cooled, e.g., by water, and the mould halves 21, 22 separated so that the shell 10 can be removed.

As will be seen in FIG. 2, the outer wall 12 has a wall portion 30 which constitutes the lower wall of the seat portion 16. The portion 30 has two grooves 31 therein which are V-shaped in plan and whose apices 32 are disposed adjacent to each other. In each of the grooves 31 there is located a substantially horizontal V-shaped portion 33 of a tubular metal member 34, each tubular metal member 34 having two substantially vertical leg portions 35 which are interconnected and separated from each other by the respective horizontal portion 33.

The tubular metal members 34 are secured to the wall portion 30 by means of two tubular metal straps 36, having flattened ends. Each strap 36 is electric resistance welded at 37 to the tubular metal members 34. Each end of each of the straps 36 is secured to the wall portion 30 by a fastening device 40, which extends into a respective cavity 41 in the wall portion 30.

As indicated in FIG. 3, each of the fastening devices 40 comprises an annular elastomeric member, or bush 44 (e.g., of rubber) which is disposed within the respective cavity 41 and which is bounded throughout its circumferential extent by the outer surface of a resilient wall 45 of the cavity 41. Each wall 45, when undeformed, is cylindrical and is disposed at right angles to the wall portion 30. The elastomeric bush 44, which has a plain hole 46 therethrough, is disposed in a position between the respective strap 36 (from which it is separated by a washer 42) and an annular backing member, or flanged bush, 47 having a flange 48 which engages one end of the elastomeric bush 44. The flanged bush 47 has an internally threaded hole 50. Thus the elastomeric bush 44 is sandwiched between the parts 42, 48.

A bolt 53, having at one end a threaded portion 54 which is threaded into the threaded hole 50, passes through a hole 55 in the strap 36 and through the holes 46, 50 all of which are aligned. The bolt 53 has a head 56 which firmly engages the strap 36.

In order to secure the straps 36 in position, a fastening device 40, loosely assembled as shown in FIG. 3, is mounted in position on each strap 36 with its bolt 53 passing through the respective hole 55 and with the head 56 engaging the lower surface of the strap 36. The wall portion 30 is now placed against the straps 36 so that each elastomeric bush 44 is freely received in its cavity 41.

The bolts 56 are now fully tightened. This forces each bush 47 and strap 36 towards each other so as axially to compress the elastomeric bush 44 and thus force the latter radially outwardly and thus firmly into contact with the resilient wall 45, so securing the parts 30, 36 together. As clearly shown in FIG. 4, the axial compression of the elastomeric bush 44 causes the latter to deform the resilient wall 45 into a re-entrant shape so that the elastomeric bush 44 is prevented from being withdrawn from the cavity 41. The tightening of the bolts 53 also, as shown, forces the wall portion 30 firmly into contact with the strap 36.

The chair shown in the drawings is thus particularly easy to assemble. Moreover, since the use of the fastening devices 40 does not necessitate the drilling of holes in the seat portion 16, production is simplified and cheapened.

The hollow one-piece construction of the shell 10 enables it to be designed so that there is more resilience in the inner wall 14 than would be possible in a single walled shell, the inner wall 14 of the shell in use being able to deflect substantially independently of the outer wall 12.

In an alternative embodiment a foamed plastics material is introduced into the shell 10 so as to fill the cavity 13. The blow-moulded shell 10 is first removed from the mould and injection and vent holes are made at opposite ends of the shell. A flexible grade mix of polyurethane foam is then injected into the shell cavity 13 from a mixing and dispersing machine. The injected liquid expands to fill the cavity 13 and sets as a flexible foam.

The polyurethane foam is formed primarily by the reaction of a polyol and an isocyanate. The composition of the polyol determines the type and grade of urethane produced, e.g., whether a polyether or polyester is produced. The foam structure of the polyurethane so formed is produced by a secondary reaction between water and excess isocyanate, which reaction produces carbon dioxide. Alternatively the foam structure may be produced by the use of a suitable blowing agent.

By filling the cavity 13 of the shell with a foamed polyurethane, the strength of the shell 10 is increased. Thus in this embodiment it is possible to make the shell 10 with walls of a thinner cross-section than would be desirable, from strength considerations, in the preferred embodiment.

Additionally, the filling of the cavity 13 of the shell 10 with foamed polyurethane renders the shell more comfortable in use.

It will be appreciated that while the invention has been described with reference to the seat shell of a chair, the seat shell could be that of, for example, a bench, soafa or the like. It will also be appreciated that it is not essential for the seat shell to be provided with the tubular metal legs of the preferred embodiment, other types of support members being equally applicable. The seat shell could, for example, be provided with a single support member of the pedestal type. A still further possible arrangement is that the seat shell could be fitted directly onto, for example, the floor of an automobile.

I claim:

1. A seat comprising a seat shell and support structure therefor, said seat shell having inner and outer walls of blow moulded thermoplastic synthetic resin material which are integral with each other but which have a space therebetween, the seat shell having integral seat and back rest portions, the outer wall of the seat portion being resilient and having means defining a cavity therein, and a fastening device, secured to the support structure, for fastening the seat shell thereto, said fastening device being located in said cavity and deforming the resilient wall of the latter into a re-entrant shape which prevents withdrawal of the fastening device from the cavity.

2. A seat as claimed in claim 1 in which the fastening device comprises elastomeric means which are disposed between two members, and clamping means which force the two members towards each other so as to compress the elastomeric means and thus force the latter to cause deformation of the resilient wall.

3. A seat as claimed in claim 1 in which the cavity, when undeformed, has a cylindrical wall which is at right angles to the outer wall of the seat portion.

4. A seat as claimed in claim 1 in which there are a plurality of the said cavities and of the said fastening devices.

5. A seat comprising an L-shaped seat shell and support structure therefor, said L-shaped seat shell having inner and outer walls of blow-moulded thermoplastic synthetic resin material which are integral with each other but which have a space therebetween, the seat shell having integral seat and backrest portions, the outer wall of the seat portion being resilient and having means defining a plurality of spaced apart cavities therein, each cavity, when undeformed, having a cylindrical wall which is at right angles to the outer wall of the seat portion, and a plurality of fastening devices, secured to the support structure, for fastening the seat shell thereto, each said fastening device being located in a said cavity and comprising elastomeric means which are disposed between two members, and clamping means which force the two members of each fastening device towards each other so as to compress each elastomeric means and force the latter to deform the respective resilient wall of the cavity into a re-entrant shape which prevents withdrawal of the fastening device from the respective cavity.

6. A seat as claimed in claim 5 in which the outer wall of the seat portion has two grooves therein which are V-shaped in plan and whose apices are disposed adjacent to each other, a tubular metal member located in each said groove, and two straps which are secured to the tubular metal members, each said strap being secured to the outer wall of the seat portion by a said fastening device located in a said cavity.

* * * * *